United States Patent
Ting et al.

(10) Patent No.: US 9,024,892 B2
(45) Date of Patent: May 5, 2015

(54) MOBILE DEVICE AND GESTURE DETERMINATION METHOD

(75) Inventors: Kuei-Ping Ting, Taipei Hsien (TW); Chao-Kuang Yang, Taipei Hsien (TW)

(73) Assignee: Acer Incorporated, Taipei Hsien (TW)

( * ) Notice: Subject to any disclaimer, the term of this patent is extended or adjusted under 35 U.S.C. 154(b) by 88 days.

(21) Appl. No.: 13/557,740

(22) Filed: Jul. 25, 2012

(65) Prior Publication Data

US 2013/0285934 A1    Oct. 31, 2013

(30) Foreign Application Priority Data

Apr. 26, 2012    (TW) .............................. 101114861 A

(51) Int. Cl.
*G06F 3/041*    (2006.01)
*G06F 3/0488*    (2013.01)

(52) U.S. Cl.
CPC .......... *G06F 3/04883* (2013.01); *G06F 3/0488* (2013.01)

(58) Field of Classification Search
CPC ................. G06F 3/017; G06F 3/0488; G06F 2203/04808; G06F 2203/04104; G06F 3/0346
USPC ....................................................... 345/173
See application file for complete search history.

(56) References Cited

U.S. PATENT DOCUMENTS

| | | | |
|---|---|---|---|
| 2009/0251427 A1 | 10/2009 | Hung et al. | |
| 2009/0289908 A1 | 11/2009 | Chen et al. | |
| 2010/0001967 A1* | 1/2010 | Yoo | 345/173 |
| 2010/0321321 A1* | 12/2010 | Shenfield et al. | 345/173 |
| 2011/0279386 A1* | 11/2011 | Chang et al. | 345/173 |
| 2012/0009896 A1 | 1/2012 | Bandyopadhyay et al. | |
| 2012/0050009 A1 | 3/2012 | Hsieh | |
| 2013/0113723 A1* | 5/2013 | Chen et al. | 345/173 |

FOREIGN PATENT DOCUMENTS

| | | |
|---|---|---|
| KR | 2011-0027544 | 3/2011 |
| TW | I299825 | 8/2008 |
| TW | 200943156 | 10/2009 |

(Continued)

OTHER PUBLICATIONS

Korean language office action dated May 26, 2014, and English language translation.
English language translation of abstract of KR 2011-0027544 (published Mar. 16, 2011).

(Continued)

*Primary Examiner* — Sahlu Okebato
(74) *Attorney, Agent, or Firm* — McClure, Qualey & Rodack, LLP

(57) ABSTRACT

An exemplary embodiment provides a mobile device. The mobile device includes a display panel, a touch panel, and a processing unit. The display panel displays images. The touch panel detects a gesture and receives a sensing signal corresponding to the gesture, wherein the touch panel further calculates at least one contact point produced by the gesture according to the sensing signal, and produces at least one trigger signal according to the contact point. The processing unit operates at a first operating frequency when the mobile device is in a normal operating mode, and operates at a second operating frequency lower than the first operating frequency when the mobile device is in a hibernate mode, wherein the mobile device turns off the processing unit and the display panel in the hibernate mode, and the touch panel continues to detect the gesture in the hibernate mode.

15 Claims, 7 Drawing Sheets

(56) References Cited

FOREIGN PATENT DOCUMENTS

| TW | 200949638 | 12/2009 |
|----|-----------|---------|
| TW | 201209645 | 3/2012  |

OTHER PUBLICATIONS

TW Office Action dated Apr. 29, 2014.
English language Abstract of TWI299825 (Published Aug. 11, 2008).

* cited by examiner

MOBILE DEVICE AND GESTURE DETERMINATION METHOD

CROSS REFERENCE TO RELATED APPLICATIONS

This application claims priority of Taiwan Patent Application No. 101114861, filed on Apr. 26, 2012, the entirety of which is incorporated by reference herein.

BACKGROUND OF THE INVENTION

1. Field of the Invention

The present invention relates to a mobile device, and in particular relates to a mobile device capable of being unlocked by a specific gesture without triggering the unlock function by a physical button.

2. Description of the Related Art

Presently, mobile devices are highly developed and multi-functional. For example, handheld devices, such as mobile phones or tablets, are capable of telecommunications, receiving/transmitting e-mails, maintaining social networks, managing contacts, and playing media, etc. Hence, users can implement various applications on their mobile devices, such as making a simple phone call, handling social networks, or engaging in a commercial transaction. Therefore, mobile devices have become one of the necessities of people's lives, and the recording of personal information stored in the mobile device has become increasingly diverse and important.

Most of the current handheld devices include touch screens and touch units. Users may input information and commands by the touch screens and touch units. When a user has not operated the handheld device for a predetermined amount of time, the device will automatically enter a locked state. Hence, the user has to unlock the device to operate the device in a normal operation mode.

Generally, the handheld device can be unlocked by entering a predetermined code or sliding the screen according to the instruction on the device after triggering a button. However, the operations and codes of unlocking are complicated and need to be memorized, which may cause inconvenience for users in some conditions. For example, the handheld device is slippery and not stable when the user uses only one hand to unlock the mobile device, which can cause inconvenience for some users.

BRIEF SUMMARY OF THE INVENTION

A detailed description is given in the following embodiments with reference to the accompanying drawings.

An exemplary embodiment provides a mobile device. The mobile device includes a display panel, a touch panel, and a processing unit. The display panel is configured to display images. The touch panel is configured to detect a gesture and receive a sensing signal corresponding to the gesture, wherein the touch panel is further configured to calculate at least one contact point produced by the gesture according to the sensing signal, and produce at least one trigger signal according to the contact point. The processing unit is configured to operate at a first operating frequency when the mobile device is in a normal operating mode, and operate at a second operating frequency lower than the first operating frequency when the mobile device is in a hibernate mode, wherein the mobile device turns off the processing unit and the display panel in the hibernate mode, and the touch panel continues to detect the gesture in the hibernate mode.

Another exemplary embodiment provides a gesture determination method, applied to a mobile device, wherein the mobile device includes a touch panel and a display panel. The gesture determination method includes determining whether a sensing signal corresponding to a gesture produces a predetermined number of trigger signals and whether the predetermined number of trigger signals last for a predetermined period, when the mobile device is in a hibernate mode; determining whether a plurality of contact points corresponding to the gesture constitute a natural gesture meeting ergonomic standards according to the positions of the contact points represented by the trigger signals when the sensing signal produces the predetermined number of trigger signals and the predetermined number of trigger signals last for the predetermined period; and forcing the mobile device to enter the normal operating mode from the hibernate mode when the contact points corresponding to the gesture constitute a natural gesture.

BRIEF DESCRIPTION OF THE DRAWINGS

The exemplary embodiments can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
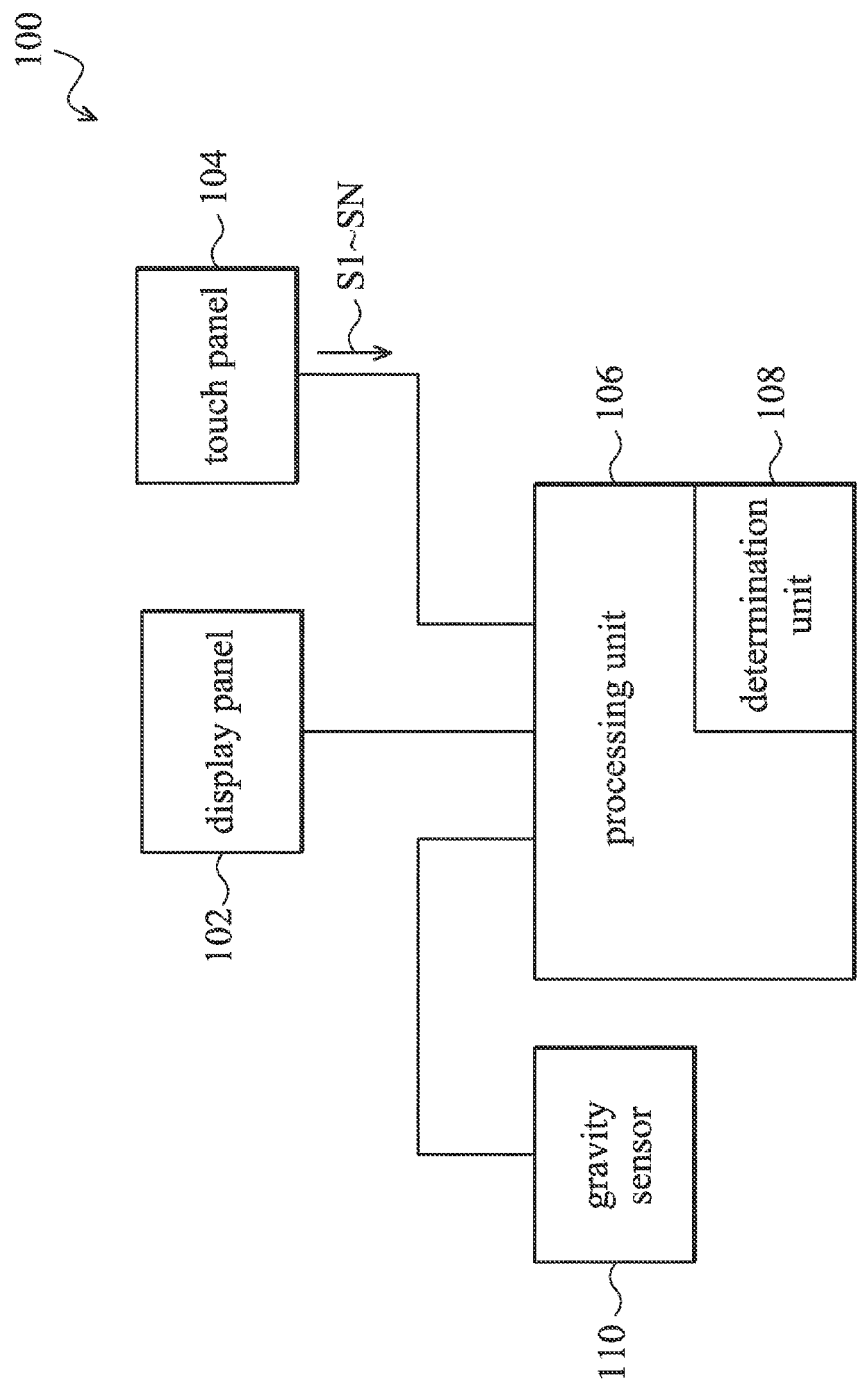
FIG. 1 is a schematic diagram illustrating a mobile device according to an exemplary embodiment.

FIG. 1 is a schematic diagram illustrating a mobile device according to an exemplary embodiment. The mobile device 100 is capable of operating in a normal operating mode and a hibernate mode (or suspend mode). The mobile device 100 can be a mobile phone, a notebook, a personal digital assistant, etc., and it is not limited thereto. The mobile device 100 includes a display panel 102, a touch panel 104, a processing unit 106, a determination unit 108, and a gravity sensor 110. The display panel 102 is configured to display images. The touch panel 104 is disposed on the display panel 102 to cover the display panel 102 or is embedded in the display panel 102. Furthermore, the touch panel 104 is configured to detect at least one gesture and the number of contact point(s) produced by the gesture on the touch panel 104. The touch panel 104 receives a sensing signal produced by object(s) (i.e. fingers, stylus, or other sensed devices) which is/are touching the touch panel 104, and calculates the number and coordinate(s) of the contact point(s) produced by the gesture according to the sensing signal to produce at least one trigger signal(s) S1-SN corresponding to the at least one contact point(s). For example, the touch panel 104 produces only one trigger signal S1 when the user touches the touch panel 104 with one finger. In another embodiment, the touch panel 104 produces two trigger signals S1-S2 when the user touches the touch panel 104 with two fingers, and so on. It should be noted that the display panel 102 can be a light-emitting diode display panel, an LCD display panel, a plasma display panel, a flexible display panel, etc., and it is not limited thereto. The touch panel 104 can be a resistive touch panel, a capacitive touch panel, a piezoelectric touch panel, etc., and it is not limited thereto. The processing unit 106 is configured to execute commands and enable the elements of the mobile device 100, wherein the processing unit 106 can be a central processor or a microprocessor, etc. The determination unit 108 is implemented in the processing unit 106. Furthermore, the determination unit 108 is configured to determine whether the mobile device 100 is required to enter the normal operating mode from the hibernate mode according to the trigger signal(s) S1-SN produced by the touch panel 104, and accordingly provide a determination result to the processing unit 106 to determine the display orientation of the display panel 102 after the mobile device 100 enters the normal operating mode from the hibernate mode. It should be noted that, in another embodiment, the determination unit 108 can also be implemented outside of the processing unit 106. Additionally, the determination unit 108 is further configured to enable the processing unit 106 to force the mobile device 100 to enter the normal operating mode from the hibernate mode according to the determination result, and determine the display orientation of the display panel 102 after the mobile device 100 enters the normal operating mode from the hibernate mode. It should be noted that the step of forcing the mobile device 100 to enter the normal operating mode from the hibernate mode is unlocking the mobile device 100. Moreover, the mobile device 100 can further include a storage device (not shown) configured to store data on the determination rules to identify whether the contact point(s) corresponding to the gesture constitute(s) a predetermined gesture or a natural gesture which meets ergonomic standards. In another embodiment, the storage unit (not shown) is further configured to store data on the determination rules to identify whether the contact point(s) produced by the sensed device constitute(s) a predetermined gesture or a natural gesture which meets the ergonomic criteria. The processing unit 106 determines whether the sensing signal produced by the touch panel 104 constitutes a natural gesture or the predetermined gesture according to the determination rules stored in the storage device (not shown) when the mobile device 100 is in the normal operating mode. The determination unit 108 determines whether the sensing signal produced by the touch panel 104 constitutes a natural gesture or a predetermined gesture according to the determination rules stored in the storage device (not shown) when the mobile device 100 is in the hibernate mode.

It should be noted that, in the normal operating mode, the processing unit 106 of the mobile device 100 executes commands, and the operating system, applications, the display panel 102, the touch panel 104, the determination unit 108, and the gravity sensor 110 work normally. The mobile device 100 may enter the hibernate mode by different definitions to save the power, such as the Advanced Configuration and Power Interface (ACPI) defined by Microsoft, or other definitions defined by the Advanced RISC Machine (ARM). For example, in the Advanced Configuration and Power Interface, the normal operating mode of the present invention is status S0, and the hibernate mode of the present invention can be status S1, S2, S3, or S4. In another embodiment, both the display panel 102 and the processing unit 106 are turned off and both the determination unit 108 and touch panel 104 are turned on, when the mobile device 100 is in the hibernate mode.

In the exemplary embodiments, the processing unit 106 operates at a first operating frequency and the touch panel 104 detects the gesture at a first frequency when the mobile device 100 is in the normal operating mode. The processing unit 106 operates at a second operating frequency and turns off the display panel 102 when the mobile device 100 is in the hibernate mode, wherein the second operating frequency of the processing unit 106 is lower than the first operating frequency. It should be noted that the processing unit 106 does not turn off the touch panel 104, and the touch panel 104 continues to detect the gesture at a second frequency when the mobile device 100 is in the hibernate mode, wherein the second frequency is lower than the first frequency. Additionally, the determination unit 108 is further configured to determine whether the sensing signal received by the touch panel 104 produces a predetermined number of trigger signals S1-SN and whether the trigger signals S1-SN last for a predetermined period when the mobile device 100 is in the hibernate mode. The determination unit 108 determines whether the contact point(s) corresponding to the gesture constitute(s) a natural gesture according to the position(s) of the contact point(s) represented by the trigger signal(s), when the sensing signal received by the touch panel 104 produces the predetermined number of trigger signals S1-SN and the trigger signals S1-SN last for a predetermined period. The determination unit 108 forces the mobile device 100 to enter the normal operating mode from the hibernate mode when the contact point(s) corresponding to the gesture constitute(s) a natural gesture. The gravity sensor 110 is configured to detect the direction of gravity relative to the mobile device 100 in the normal operating mode to determine the display orientation of the display panel 102. It should be noted that the predetermined period is 0.5-2 seconds, and it is not limited thereto.

Figure 2:
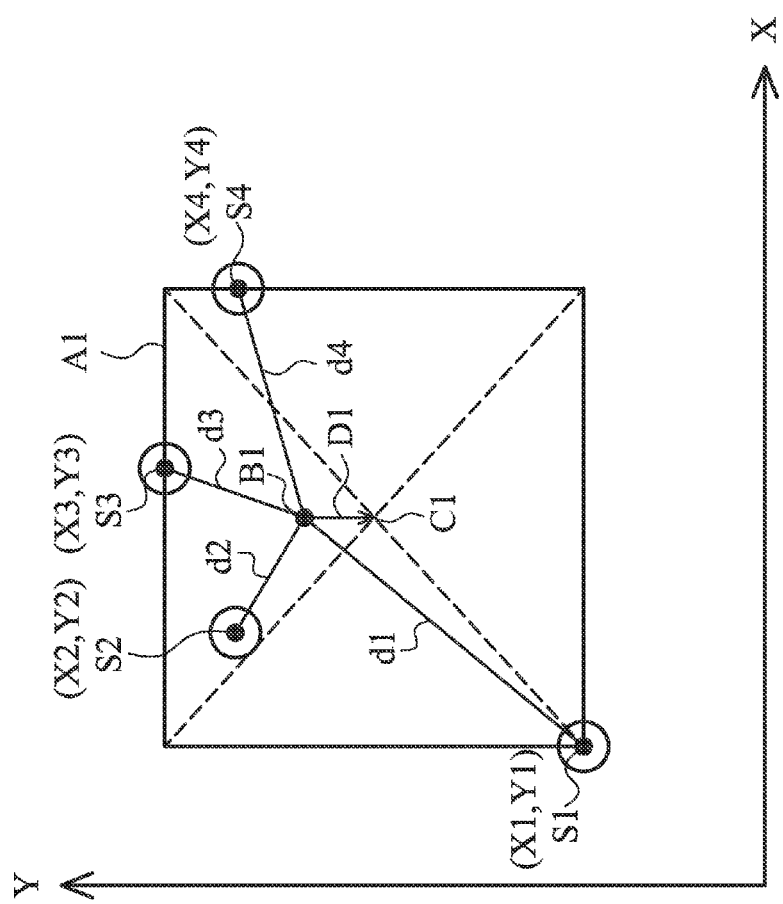
FIG. 2 is a schematic diagram illustrating a plurality of trigger signals received by a touch panel according to an exemplary embodiment.

FIG. 2 is a schematic diagram illustrating a plurality of trigger signals received by a touch panel according to an exemplary embodiment. In this embodiment, the predetermined number is four. As shown in FIG. 2, when the sensing signal produces four trigger signals S1-S4 and the four trigger signals S1-S4 last for a predetermined period, the determination unit 108 is configured to calculate the barycenter B1 of the trigger signals S1-S4 according to the positions of the contact points represented by the trigger signals S1-S4, and determine whether the contact points corresponding to the gesture constitute a natural gesture according to the barycenter B1. Additionally, the determination unit 108 is further configured to calculate a plurality of distances d1-d4 between the positions of contact points represented by the trigger signals S1-S4 and the barycenter B1, respectively, and compare the longest distance d1 with the other distances d2-d4 to determine whether the contact points corresponding to the gesture constitute a natural gesture.

In one of the exemplary embodiments, the determination unit 108 obtains a sum of the distances d2-d4 by excluding the longest distance d1, and divides the sum by a number to obtain an average, wherein the number is the predetermined number minus one. Additionally, the determination unit 108 further multiplies the average by a constant to obtain a determination value, wherein the constant is a fraction or integer which is greater than or equal to one, such as 1, 3/2, 5/4, etc., and it is not limited thereto. Furthermore, the determination unit 108 determines that the contact points corresponding to the gesture constitute a natural gesture when the determination value is less than the longest distance (i.e. distance d1). In another embodiment, the determination unit 108 adds the distances d1-d4 to obtain a sum, and divides the sum by the predetermined number, i.e. four, to obtain an average. Additionally, the determination unit 108 further multiplies the average by a constant to obtain a determination value, wherein the constant is a fraction or integer which is greater than or equal to one, such as 1, 3/2, 5/4, etc., and it is not limited thereto. Furthermore, the determination unit 108 determines that the contact points corresponding to the gesture constitute a natural gesture when the determination value is less than the longest distance (i.e. distance d1).

When the contact points corresponding to the gesture constitute a natural gesture, the determination unit 108 is configured to determine a largest rectangle A1 formed by the trigger signals S1-S4 and calculate the center C1 of the largest rectangle A1, wherein the determination unit 108 is further configured to determine the display orientation of the display panel 102 after the mobile device enters the normal operating mode from the hibernate mode according to the direction D1 from the barycenter B1 to the center C1. For example, each of the trigger signals S1-S4 has an X-coordinate and a Y-coordinate, respectively. The two-dimensional coordinate of the trigger signal S1 is (X1, Y1), such that the trigger signal S1 has an X-coordinate X1 and a Y-coordinate Y1. Similarly, the trigger signal S2 has an X-coordinate X2 and a Y-coordinate Y2, the trigger signal S3 has an X-coordinate X3 and a Y-coordinate Y3, and the trigger signal S4 has an X-coordinate X4 and a Y-coordinate Y4. It should be noted that the origin of the two-dimensional coordinate can be implemented at one of the angles of the touch panel 104, or at the center of the touch panel 104, and it is not limited thereto. The determination unit 108 selects the largest X-coordinate X4, the smallest X-coordinate X1, the largest Y-coordinate Y3, and the smallest Y-coordinate Y1 from the X-coordinates and the Y-coordinates of the trigger signals S1-S4, and uses the largest X-coordinate X4, the smallest X-coordinate X1, the largest Y-coordinate Y3, and the smallest Y-coordinate Y1 as four sides to determine the largest rectangle A1. Moreover, the determination unit 108 calculates the intersection point of the diagonal lines of the largest rectangle A1, wherein the intersection point of the diagonal lines is the center C1 of the largest rectangle A1.

In another embodiment, the determination unit 108 can calculate the average of the largest X-coordinate X4 and the smallest X-coordinate X1, and the average of the largest Y-coordinate Y3 and the smallest Y-coordinate Y1, respectively, wherein the average of the X-coordinate X4 and X1 and the average of the Y-coordinate Y3 and Y1 can be the X-coordinate and Y-coordinate of the center C1, respectively, and it is not limited thereto. Therefore, the determination unit 108 can determine the display orientation of the display panel 102 after the mobile device 100 enters the normal operating mode from hibernate mode according to the direction D1 from the barycenter B1 to the center C1. In one of the embodiments, the determination unit 108 can provide the direction D1 to the display panel 102 to serve as the display orientation (i.e. up, down, left, right). In another embodiment, the determination unit 108 can provide the direction D1 to the gravity sensor 110. The gravity sensor 110 is configured to use the direction D1 from the barycenter B1 to the center C1 as a predetermined value, and provide the predetermined value to the display panel 102. The display panel 102 determines the display orientation after the mobile device 100 enters the normal operating mode from hibernate mode according to the predetermined value (i.e. up, down, left, right).

Figure 3:
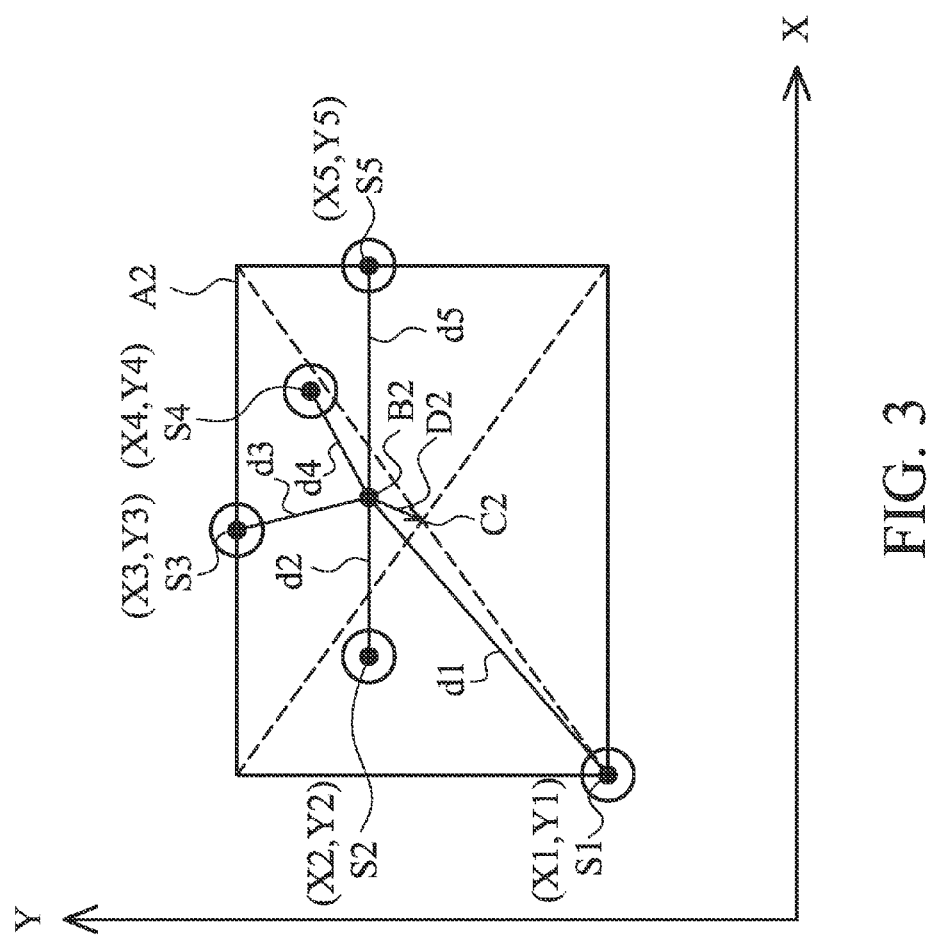
FIG. 3 is a schematic diagram illustrating a plurality of trigger signals received by a touch panel according to another exemplary embodiment.

FIG. 3 is a schematic diagram illustrating a plurality of trigger signals received by a touch panel according to another exemplary embodiment. FIG. 3 is similar to FIG. 2 except that the predetermined number of the embodiment of FIG. 3 is 5. As shown in FIG. 3, when the sensing signal produces five trigger signals S1-S5 and the five trigger signals S1-S5 last for a predetermined period, the determination unit 108 is configured to calculate the barycenter B2 of the trigger signals S1-S5 according to the positions of the contact points represented by the trigger signals S1-S5, and determine whether the contact points corresponding to the gesture constitute a natural gesture according to the barycenter B2. When the contact points corresponding to the gesture constitute a natural gesture, the determination unit 108 is configured to determine a largest rectangle A2 formed by the trigger signals S1-S5 and calculate the center C2 of the largest rectangle A2, wherein the determination unit 108 is further configured to determine the display orientation of the display panel 102 after the mobile device enters the normal operating mode from the hibernate mode according to the direction D2 from the barycenter B2 to the center C2. For example, each of the trigger signals S1-S4 has an X-coordinate and a Y-coordinate. The two-dimensional coordinates of the trigger signal S1 is (X1, Y1), such that the trigger signal 51 has an X-coordinate X1 and a Y-coordinate Y1. Similarly, the trigger signal S2 has an X-coordinate X2 and a Y-coordinate Y2, the trigger signal S3 has an X-coordinate X3 and a Y-coordinate Y3, the trigger signal S4 has an X-coordinate X4 and a Y-coordinate Y4, and the trigger signal S5 has an X-coordinate X5 and a Y-coordinate Y5. For the other details of FIG. 3, reference can be made to FIG. 2, and it is not discussed in further detail herein.

Figure 4:
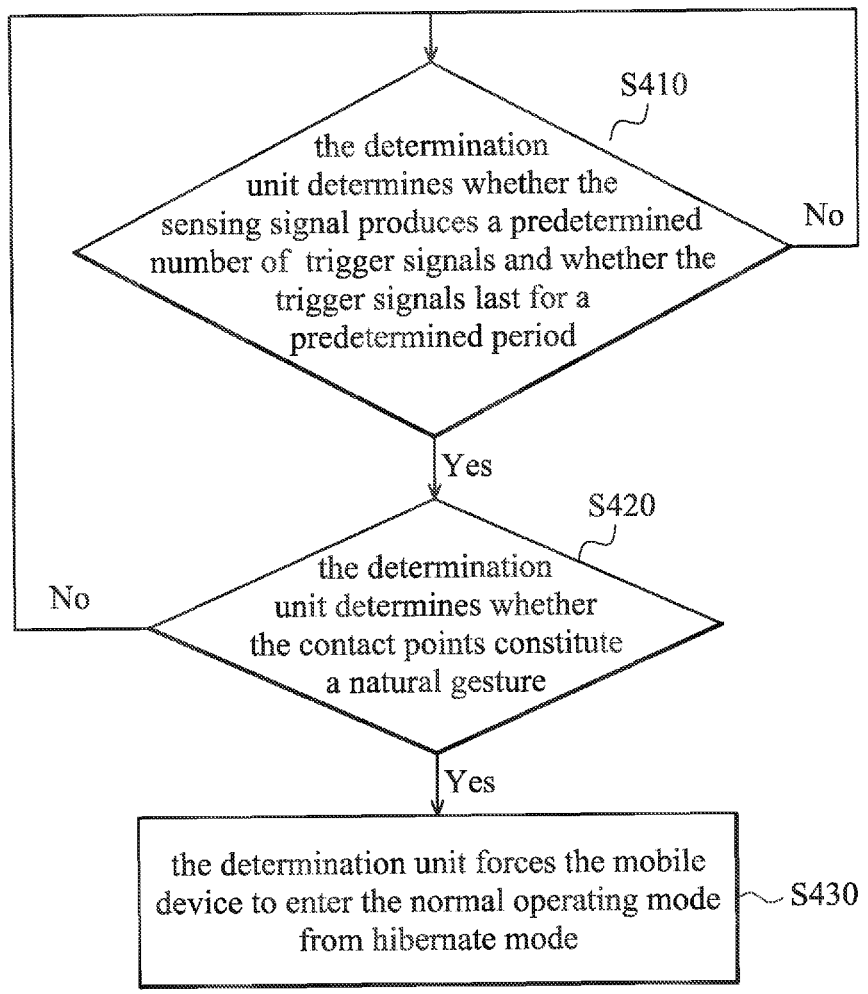
FIG. 4 is a flowchart of a gesture determination method according to an exemplary embodiment.

FIG. 4 is a flowchart of a gesture determination method according to an exemplary embodiment, wherein the gesture determination method is applied to the mobile device 100 of FIG. 1. The process starts at step S410.

In step S410, the determination unit 108 determines whether the sensing signal received by the touch panel 104 produces a predetermined number of trigger signals S1-SN and whether the trigger signals last for a predetermined period, when the mobile device 100 is in the hibernate mode. It should be noted that the predetermined number is 4 in one embodiment. In another embodiment, the predetermined number is 5. When the sensing signal produces the predetermined number of trigger signals S1-SN and the trigger signals S1-SN last for the predetermined period, the process goes to step S420, otherwise, the determination unit 108 continues to determine whether the sensing signal produces a predetermined number of trigger signals S1-SN and whether the trigger signals S1-SN last for the predetermined period.

In step S420, the determination unit 108 determines whether the contact points corresponding to the gesture constitute a natural gesture meeting ergonomic standards according to the positions of the contact point represented by the trigger signals. For details of determining whether the contact points corresponding to the gesture constitute a natural gesture, reference can be made to FIGS. 6-7. When the contact points corresponding to the gesture constitute a natural gesture, the process goes to step S430, otherwise, the process goes back to step S410.

In step S430, the determination unit 108 forces the mobile device 100 to enter the normal operating mode from the hibernate mode. The process ends at step S430.

Figure 5:
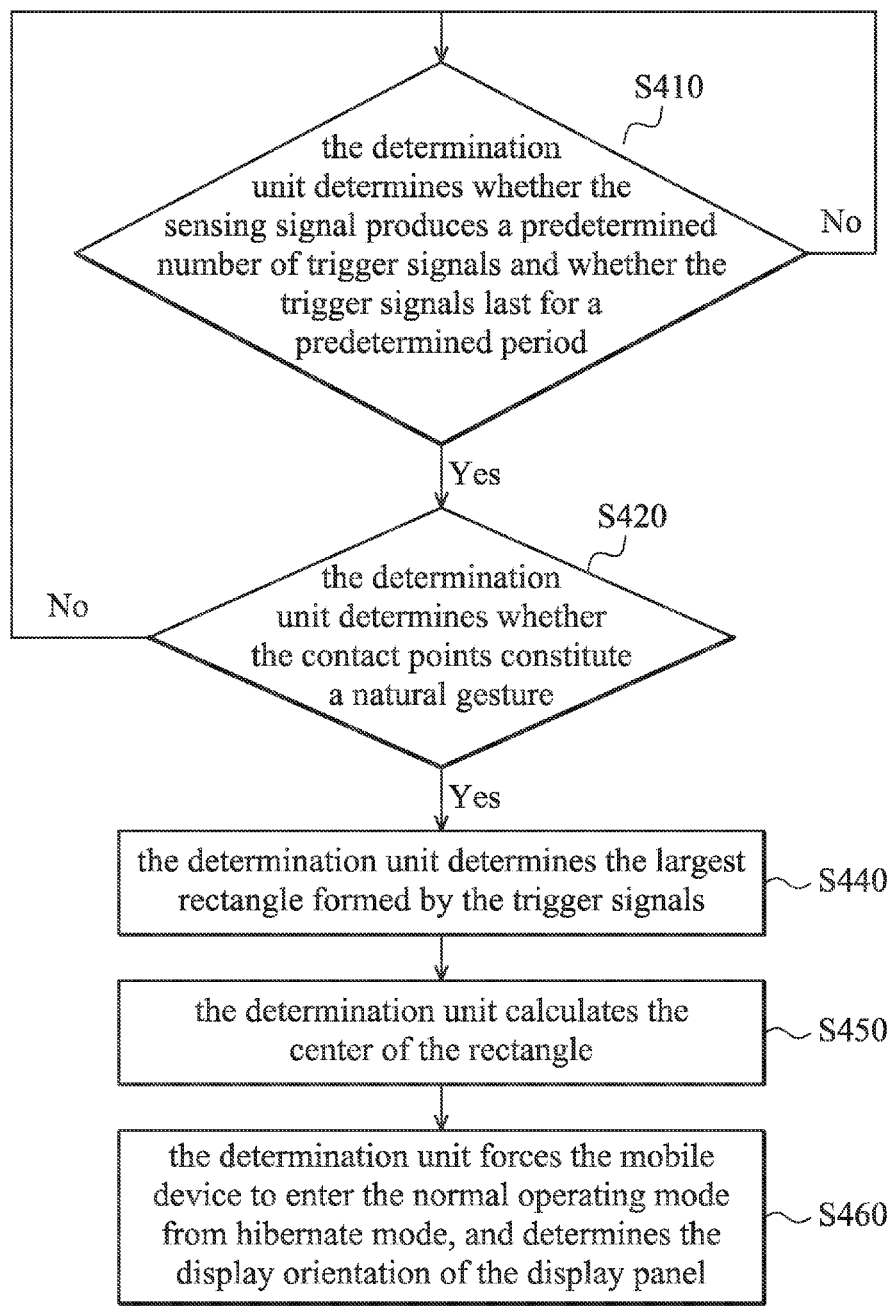
FIG. 5 is a flowchart of a gesture determination method according to another exemplary embodiment.

FIG. 5 is a flowchart of a gesture determination method according to another exemplary embodiment, wherein the gesture determination method is applied to the mobile device 100 of FIG. 1. The process starts at step S410. For details of step S410, reference can be made to step S410 in FIG. 4, and it is not discussed in further detail herein.

In step S420, the determination unit 108 determines whether the contact points corresponding to the gesture constitute a natural gesture according to the positions of the contact points represented by the trigger signals. For details of determining whether the contact points corresponding to the gesture constitute a natural gestural, reference can be made to FIGS. 6-7. When the contact points corresponding to the gesture constitute a natural gesture, the process goes to step S440, otherwise, the process goes back to step S410.

In step S440, the determination unit 108 determines the largest rectangle formed by the trigger signals S1-SN. For example, the determination unit 108 selects the largest X-coordinate X4, the smallest X-coordinate X1, the largest Y-coordinate Y3, and the smallest Y-coordinate Y1 from the X-coordinates and the Y-coordinates of the trigger signals S1-S4, and uses the largest X-coordinate X4, the smallest X-coordinate X1, the largest Y-coordinate Y3, and the smallest Y-coordinate Y1 as four sides to determine the largest rectangle A1.

Next, in step S450, the determination unit 108 calculates the center of the rectangle. It should be noted that the determination unit 108 can calculate the intersection point of the diagonal lines of the largest rectangle A1, wherein the intersection point of the diagonal lines is the center C1 of the largest rectangle A1. In another embodiment, the determination unit 108 can calculate the average of the largest X-coordinate X4 and the smallest X-coordinate X1, and the average of the largest Y-coordinate Y3 and the smallest Y-coordinate Y1 respectively, wherein the average of the X-coordinate X4 and X1 and the average of the Y-coordinate Y3 and Y1 can be the X-coordinate and Y-coordinate of the center C1 respectively, and it is not limited thereto.

Next, in step S460, the determination unit 108 forces the mobile device 100 to enter the normal operating mode from the hibernate mode, and determines the display orientation of the display panel 102 after the mobile device enters the normal operating mode from the hibernate mode according to the direction from the barycenter to the center. In one of the embodiments, the determination unit 108 can provide the direction D1 to the gravity sensor 110. The gravity sensor 110 is configured to use the direction D1 from the barycenter B1 to the center C1 as a predetermined value, and provide the predetermined value to the display panel 102. The display panel 102 determines the display orientation after the mobile device 100 enters the normal operating mode from hibernate mode according to the predetermined value. The process ends at step S460.

Figure 6:
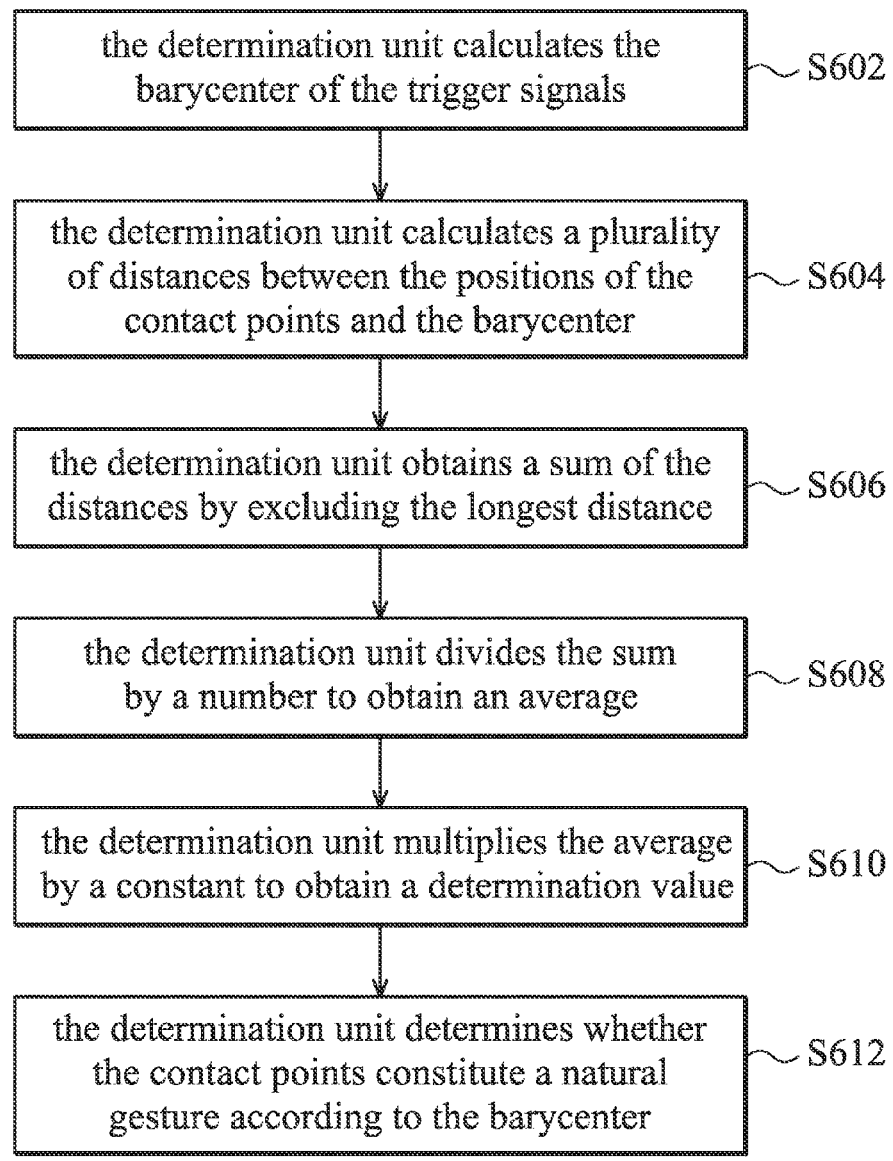
FIG. 6 is a flowchart for determining whether a gesture constitutes a natural gesture according to an exemplary embodiment.

FIG. 6 is a flowchart for determining whether a gesture constitutes a natural gesture according to an exemplary embodiment. The process starts at step S602. It should be noted that the process corresponds to the embodiment of FIG. 2, and it is not limited thereto.

In step S602, the determination unit 108 calculates the barycenter B1 of the trigger signals S1-S4 according to the positions of the contact points represented by the trigger signals S1-S4. Next, in step S604, the determination unit 108 calculates a plurality of distances d1-d4 between the positions of the contact points represented by the trigger signals S1-S4 and the barycenter B1, respectively. Next, in step S606, the determination unit 108 obtains a sum of the distances d2-d4 by excluding the longest distance d1. Next, in step S608, the determination unit 108 divides the sum by a number to obtain an average, wherein the number is the predetermined number minus one, that is 3 (4 minus 1). Next, in step S610, the determination unit 108 multiplies the average obtained from step S608 by a constant to obtain a determination value, wherein the constant is a fraction or integer which is greater than or equal to one, such as 1, 3/2, 5/4, etc., and it is not limited thereto. Next, in step S612, the determination unit 108 compares the longest distance d1 with the other distances d2-d4 to determine whether the contact points corresponding to the gesture constitute a natural gesture according to the barycenter B1. For example, the determination unit 108 determines that the contact points corresponding to the gesture constitute a natural gesture when the determination value is less than the longest distance (i.e. distance d1). The process ends at step S612.

Figure 7:
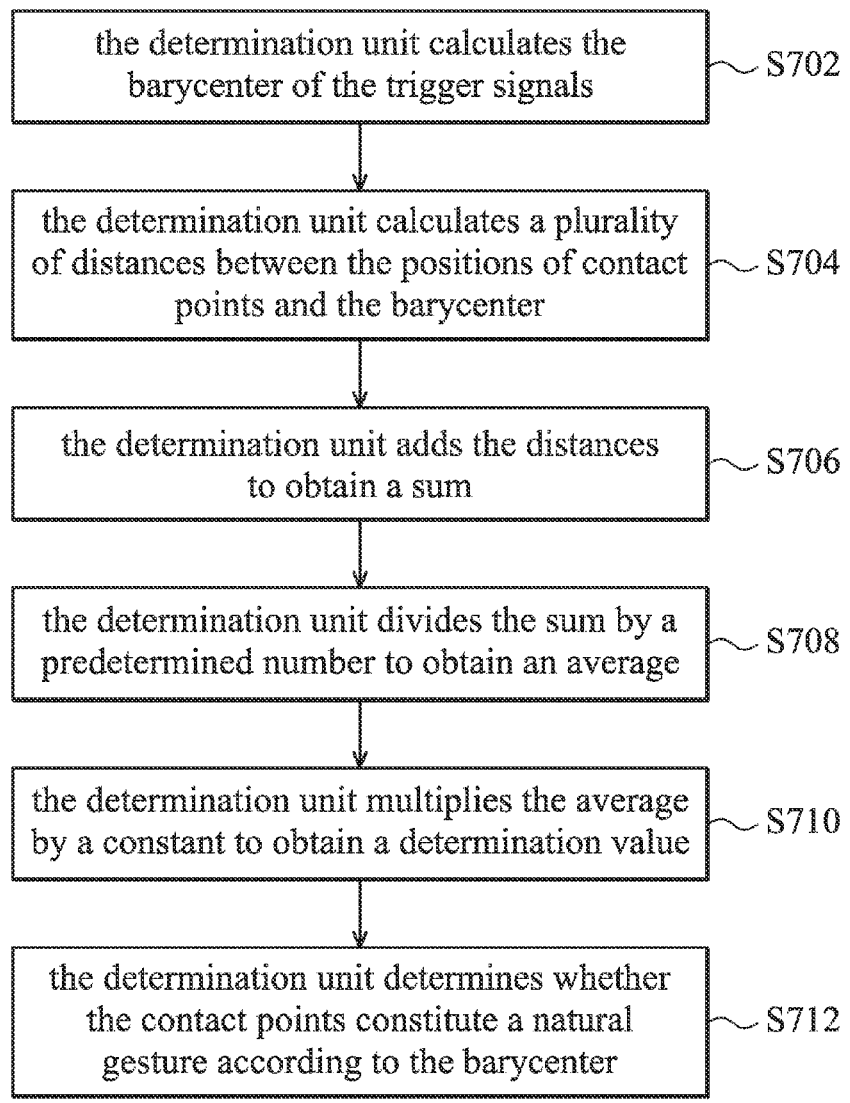
FIG. 7 is a flowchart for determining whether a gesture constitutes a natural gesture according to another exemplary embodiment.

FIG. 7 is a flowchart for determining whether a gesture constitutes a natural gesture according to another exemplary embodiment. The process starts at step S702. It should be noted that the process corresponds to the embodiment of FIG. 2, and it is not limited thereto. Moreover, steps S702-S704 are same as steps S602-S604 of FIG. 6, and it is not discussed in further detail herein.

In step S706, the determination unit 108 adds the distances d1-d4 to obtain a sum. Next, in step S708, the determination unit 108 divides the sum obtained from step S706 by a predetermined number to obtain an average, wherein the predetermined number is 4. Next, in step S710, the determination unit 108 multiplies the average obtained from step S708 by a constant to obtain a determination value, wherein the constant is a fraction or integer which is greater than or equal to one, such as 1, 3/2, 5/4, etc., and it is not limited thereto. Next, in step S712, the determination unit 108 compares the longest distance d1 with the other distances d2-d4 to determine whether the contact points corresponding to the gesture constitute a natural gesture according to the barycenter B1. For example, the determination unit 108 determines that the contact points corresponding to the gesture constitute a natural gesture when the determination value is less than the longest distance (i.e. distance d1). The process ends at step S712.

As described above, the exemplary embodiments provide a mobile device 100 and a gesture determination method, which are configured to unlock the mobile device 100 without a physical button and automatically adjust the display orientation after unlocking.

Gesture determination methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A mobile device, comprising:

a display panel, configured to display images;

a touch panel, configured to detect a gesture and receive a sensing signal corresponding to the gesture, wherein the touch panel is further configured to calculate at least one contact point produced by the gesture according to the sensing signal, and produce at least one trigger signal according to the contact point, wherein the touch panel is further configured to detect the gesture at a first frequency in a normal operating mode; and a processing unit, configured to operate at a first operating frequency when the mobile device is in the normal operating mode, and operate at a second operating frequency lower than the first operating frequency when the mobile device is in a hibernate mode, the touch panel continues to detect the gesture at a second frequency in the hibernate mode, and the second frequency is lower than the first frequency;

a determination unit configured to determine whether the sensing signal produces a predetermined number of the trigger signals and whether the trigger signals last for a predetermined period, when the mobile device is in the hibernate mode, determine whether the at least one contact point corresponding to the gesture constitute a natural gesture meeting ergonomic standards according to positions of the at least one contact point represented by the trigger signals when the sensing signal produces the predetermined number of the trigger signals and the trigger signals last for the predetermined period, wherein the predetermined number is four or five, calculate a barycenter of the trigger signals according to the positions of the at least one contact point represented by the trigger signals, and determine whether the at least one contact point corresponding to the gesture constitute the natural gesture according to the barycenter;

calculate a plurality of distances between the trigger signals and the barycenter; and compare the longest distance of the calculated distances with the other distances of which to determine whether the contact points corresponding to the gesture constitute the natural gesture.

2. The mobile device as claimed in claim 1, wherein the display panel of the mobile device is turns off in the hibernate mode, and the touch panel continues to detect the gesture at the second frequency in the hibernate mode when the display panel is turned off.

3. The mobile device as claimed in claim 1, wherein the determination unit forces the mobile device to enter the normal operating mode from the hibernate mode when the at least one contact point corresponding to the gesture constitute the natural gesture.

4. The mobile device as claimed in claim 1, wherein the determination unit is further configured to calculate a plurality of distances between the trigger signals and the barycenter, respectively, and compare the longest distance of the calculated distances with the other distances of which to determine whether the at least one contact point corresponding to the gesture constitute the natural gesture.

5. The mobile device claimed as claim 4, wherein the determination unit is further configured to obtain a sum of the calculated distances by excluding the longest distance of the calculated distances, divide the sum by a number to obtain an average, and multiply the average by a constant to obtain a determination value, wherein the determination unit determines that the at least one contact point corresponding to the gesture constitute the natural gesture when the determination value is less than the longest distance, wherein the predetermined number minus one is the number, and the constant is greater than one.

6. The mobile device as claimed in claim 4, wherein the determination unit is further configured to add the calculated distances to obtain a sum, divide the sum by the predetermined number to obtain an average, and multiply the average by a constant to obtain a determination value, wherein the determination unit determines that the at least one contact point corresponding to the gesture constitute the natural gesture when the determination value is less than the longest distance, wherein the constant is greater than one.

7. The mobile device as claimed in claim 1, wherein the determination unit is further configured to determine a largest rectangle formed by the trigger signals and calculate a center of the largest rectangle when the at least one contact point corresponding to the gesture constitute the natural gesture, wherein the determination unit is further configured to determine a display orientation of the display panel after the mobile device enters the normal operating mode from the hibernate mode according to a direction from the barycenter to the center.

8. The mobile device as claimed in claim 7, wherein each of the trigger signals has an X-coordinate and a Y-coordinate, and the determination unit is further configured to select a largest X-coordinate, a smallest X-coordinate, a largest Y-coordinate, and a smallest Y-coordinate from the X-coordinates and the Y-coordinates of the trigger signals and use the largest X-coordinate, the smallest X-coordinate, the largest Y-coordinate, and the smallest Y-coordinate as four sides to determine the largest rectangle when the at least one contact point corresponding to the gesture constitute the natural gesture.

9. The mobile device as claimed in claim 7, further comprising a gravity sensor configured to use the direction from the barycenter to the center as a predetermined value, and determine the display orientation of the display panel after the mobile device enters the normal operating mode from the hibernate mode according to the predetermined value.

10. A gesture determination method, applied to a mobile device, wherein the mobile device comprises a touch panel and a display panel, the gesture determination method comprising:

determining whether a sensing signal corresponding to the gesture produces a predetermined number of trigger signals and whether the predetermined number of trigger signals last for a predetermined period, when the mobile device is in a hibernate mode, wherein the predetermined number is four or five;

determining whether a plurality of contact points corresponding to the gesture constitutes a natural gesture meeting ergonomic standards according to positions of the contact points represented by the trigger signals, when the sensing signal produces the predetermined number of trigger signals and the predetermined number of trigger signals last for the predetermined period, wherein the step of determining whether the contact points corresponding to the gesture constitute the natural gesture comprises:

calculating a barycenter of the trigger signals according to the positions of the contact points represented by the trigger signal; and determining whether the contact points corresponding to the gesture constitute the natural gesture according to the barycenter, wherein the steps of calculating the barycenter and determining whether the contact points corresponding to the gesture constitute the natural gesture further comprise:
calculating a plurality of distances between the trigger signals and the barycenter; and
comparing the longest distance of the calculated distances with the other distances of which to determine whether the contact points corresponding to the gesture constitute the natural gesture; and
forcing the mobile device to enter the normal operating mode from the hibernate mode when the contact points corresponding to the gesture constitute the natural gesture.

11. The gesture determination method as claimed in claim 10, wherein the step of determining whether the contact points corresponding to the gesture constitute the natural gesture further comprises:
obtaining a sum of the calculated distances by excluding the longest distance of the calculated distances;
dividing the sum by a number to obtain an average;
multiplying the average by a constant to obtain a determination value; and
determining that the contact points corresponding to the gesture constitute the natural gesture, when the determination value is less than the longest distance, wherein the predetermined number minus one is the number, and the constant is greater than one.

12. The gesture determination method as claimed in claim 10, wherein the step of determining whether the contact points corresponding to the gesture constitute the natural gesture further comprises:
adding the calculated distances to obtain a sum;
dividing the sum by the predetermined number to obtain an average;
multiplying the average by a constant to obtain a determination value; and
determining that the contact points corresponding to the gesture constitute the natural gesture when the determination value is less than the longest distance, wherein the constant is greater than one.

13. The gesture determination method as claimed in claim 10, further comprising:
determining a largest rectangle formed by the trigger signals when the contact points corresponding to the gesture constitute the natural gesture;
calculating a center of the largest rectangle; and
determining a display orientation of the display panel after the mobile device enters the normal operating mode from the hibernate mode according to a direction from the barycenter to the center.

14. The gesture determination method as claimed in claim 13, wherein each of the trigger signals has an X-coordinate and a Y-coordinate, and the step of determining the largest rectangle formed by the trigger signals further comprises:
selecting a largest X-coordinate, a smallest X-coordinate, a largest Y-coordinate, and a smallest Y-coordinate from the X-coordinates and the Y-coordinates of the trigger signals; and
using the largest X-coordinate, the smallest X-coordinate, the largest Y-coordinate, and the smallest Y-coordinate as four sides to determine the largest rectangle.

15. The gesture determination method claimed as claim 13, further comprising:
using the direction from the barycenter to the center as a predetermined value of a gravity sensor of the mobile device; and
determining the display orientation of the display panel after the mobile device enters the normal operating mode from the hibernate mode according to the predetermined value.

* * * * *